United States Patent
Jones et al.

(10) Patent No.: US 10,462,080 B1
(45) Date of Patent: Oct. 29, 2019

(54) VERIFYING USERS OF AN ELECTRONIC MESSAGING SYSTEM

(71) Applicant: WhatsApp Inc., Menlo Park, CA (US)

(72) Inventors: Matthew Knight Jones, Redwood City, CA (US); Apoorvavarsha Havanur, Menlo Park, CA (US); Nicole Laura Reid, San Mateo, CA (US); Zhuo Li, Foster City, CA (US); Yue Zhang, Menlo Park, CA (US)

(73) Assignee: WhatsApp Inc., Menlo Park, CA (US)

( * ) Notice: Subject to any disclaimer, the term of this patent is extended or adjusted under 35 U.S.C. 154(b) by 28 days.

(21) Appl. No.: 15/994,959

(22) Filed: May 31, 2018

Related U.S. Application Data (63) Continuation of application No. 15/964,272, filed on Apr. 27, 2018, now abandoned.

(51) Int. Cl.

| | | |
|---|---|---|
| *G06F 15/16* | (2006.01) | |
| *H04L 12/58* | (2006.01) | |
| *H04L 29/08* | (2006.01) | |
| *G06Q 10/10* | (2012.01) | |
| *H04L 29/06* | (2006.01) | |
| *G06F 16/9535* | (2019.01) | |
| *G06F 16/2457* | (2019.01) | |

(52) U.S. Cl.
CPC ...... *H04L 51/046* (2013.01); *G06F 16/24578* (2019.01); *G06F 16/9535* (2019.01); *G06Q 10/109* (2013.01); *H04L 67/10* (2013.01); *H04L 67/20* (2013.01); *H04L 67/306* (2013.01); *H04L 67/32* (2013.01); *H04L 67/42* (2013.01)

(58) Field of Classification Search
CPC ....... H04L 51/046; H04L 67/10; H04L 67/20; H04L 67/306; H04L 67/32; H04L 67/42; G06F 16/9535; G06F 16/24578; G06Q 10/109
USPC ................. 709/204, 205, 206, 224
See application file for complete search history.

(56) References Cited

U.S. PATENT DOCUMENTS

| | | | |
|---|---|---|---|
| 2006/0190536 A1* | 8/2006 | Strong ............... | G06Q 10/10 709/204 |
| 2008/0015928 A1* | 1/2008 | Chandra ............. | G06Q 30/02 705/7.29 |
| 2013/0013553 A1* | 1/2013 | Stibel ................. | G06Q 10/107 707/602 |

(Continued)

*Primary Examiner* — Liang Che A Wang
*Assistant Examiner* — Johnny B Aguiar
(74) *Attorney, Agent, or Firm* — Fenwick & West LLP (57) ABSTRACT

A server receives a request for a business account with the messaging system that includes a business name and a contact point. The server determines whether users of the messaging system associate the business name with the contact point. The server also determines whether the business name and/or the contact point has characteristics consistent with the request originating from a genuine business. The business account is validated if users of the messaging system associate the business name with the contact point and at least one of the business name or the contact point have characteristics consistent with the request originating from a genuine business. The business account profile is updated to indicate it is verified. Client devices are adapted to display messages from the business account in conjunction with a visual indicator that the business account is verified.

20 Claims, 6 Drawing Sheets

(56) References Cited

U.S. PATENT DOCUMENTS

| | | | | |
|---|---|---|---|---|
| 2014/0066044 A1* | 3/2014 | Ramnani | ............... | H04W 8/24 |
| | | | | 455/418 |
| 2015/0370905 A1* | 12/2015 | Leon | ............... | G06Q 10/10 |
| | | | | 707/722 |
| 2018/0337918 A1* | 11/2018 | Chang | ............... | H04L 63/0861 |

* cited by examiner

VERIFYING USERS OF AN ELECTRONIC MESSAGING SYSTEM

CROSS REFERENCE TO RELATED APPLICATIONS

This application is a continuation of pending U.S. application Ser. No. 15/964,272, filed Apr. 27, 2018, which is incorporated by reference in its entirety.

BACKGROUND

1. Technical Field

The subject matter described generally relates to electronic messaging and computer security and particularly to verifying that users of an electronic messaging system are associated with specified entities.

2. Background Information

As internet access has become more and more widely available, an increasing number of computer services are provided online. These services range from social networking to online retail, and technical support to telecommunications. With many consumers spending a significant amount of their life online, businesses are increasingly expanding their digital footprint and interacting directly with customers through the internet. However, with this increased use of computer technology to communicate has come new threats for consumer.

In face-to-face interactions at a physical location, consumers can generally determine whether the person they are communicating with genuinely represents a business of the desired type. On-line messaging systems present an increased security threat for consumers because the technology provides new ways for unscrupulous actors to misrepresent their identity. An account may present itself as a known business and request private information (e.g., a user name and password), but in fact be controlled by an individual or entity with no connection to the business. In other words, the technology creates a security problem because it enables an unscrupulous actor to pose as a genuine business in ways that consumers may not be well-equipped to identify.

SUMMARY

Protecting against the above referenced security problem and providing reassurance to consumers that communications and services provided online are from a genuine business may provide significant value to businesses and their customers alike. To that end, this disclosure describes mechanisms by which purported business accounts with a messaging system are automatically or semi-automatically verified as corresponding to genuine businesses. In various embodiments, a business account is verified by determining whether other users of the messaging system associate the purported business's name and contact point (e.g., phone number), whether the name has the characteristics of a business name, and/or whether the contact point is likely to belong to a genuine business.

In one embodiment, a method includes receiving a request for a business account with a messaging system. The request includes a business name and a contact point. The method also includes determining whether users of the messaging system associate the business name with the contact point as well as whether at least one of the business name or the contact point has characteristics consistent with the request originating from a genuine business. The method further includes validating the business account responsive to users of the messaging system associating the business name with the contact point and at least one of the business name or the contact point having characteristics consistent with the request originating from a genuine business. Profile data of the business account is updated to indicate that the business account is verified. The method additionally includes receiving a message from a client device that is associated with the business that includes content to display to a user of the messaging system and sending the content to a client device associated with the user in conjunction with an indication that the business account is verified. The client device is adapted to display the content in conjunction with a visual indicator that the business account is verified responsive to the indication.

In another embodiment, a non-transitory computer readable medium stores computer program instructions executable by a processor to perform operations including receiving a request for a business account with a messaging system. The request includes a business name and a contact point. The operations also include determining whether users of the messaging system associate the business name with the contact point as well as whether at least one of the business name or the contact point has characteristics consistent with the request originating from a genuine business. The operations further include validating the business account responsive to users of the messaging system associating the business name with the contact point and at least one of the business name or the contact point having characteristics consistent with the request originating from a genuine business. Profile data of the business account is updated to indicate that the business account is verified. The operations additionally include receiving a message from a client device that is associated with the business that includes content to display to a user of the messaging system and sending the content to a client device associated with the user in conjunction with an indication that the business account is verified. The client device is adapted to display the content in conjunction with a visual indicator that the business account is verified responsive to the indication.

In a further embodiment, a system includes one or more processors and one or more computer readable media storing computer program instructions that, when executed, cause the one or more processors to perform operations including receiving a request for a business account with a messaging system. The request includes a business name and a contact point. The operations also include determining whether users of the messaging system associate the business name with the contact point as well as whether at least one of the business name or the contact point has characteristics consistent with the request originating from a genuine business. The operations further include validating the business account responsive to users of the messaging system associating the business name with the contact point and at least one of the business name or the contact point having characteristics consistent with the request originating from a genuine business. Profile data of the business account is updated to indicate that the business account is verified. The operations additionally include receiving a message from a client device that is associated with the business that includes content to display to a user of the messaging system and sending the content to a client device associated with the user in conjunction with an indication that the business account is verified. The client device is adapted to display the content in conjunction with a visual indicator that the business account is verified responsive to the indication.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

An on-line messaging service enables users to communicate with each other. Businesses can use the service to send information to potential customers. As described previously, with the use of technology comes new ways in which unscrupulous actors may mislead consumers. Businesses often handle with sensitive information about consumers, from names and dates of birth to credit card numbers and bank account details, and it would be convenient for consumers to provide this information directly through the on-line messaging system. However, this represents a security risk if an unscrupulous actor can successfully pose as a genuine business and solicit private information from the consumer.

Overview

To address the above and other problems, an on-line messaging service verifies that user accounts that purport to be a business are associated with a genuine business. In one embodiment, the on-line messaging service has a signup process for creating a business account. As part of the process, the business provides a business name and contact information (e.g., a phone number), which is used to verify that the request originated from a genuine business. This can include confirming that the contact information is associated with the business name and analyzing whether the business name and contact information have features indicative of a genuine business (e.g., by applying a machine-learned model).

Although the verification of businesses in described herein as part of an online messaging system signup process, one of skill in the art will recognize that these techniques may be applicable in other contexts. For example, the described approaches may be used in a social networking system to identify existing personal accounts that correspond to a business and suggest converting them to a business account.

System Architecture

Figure 1:
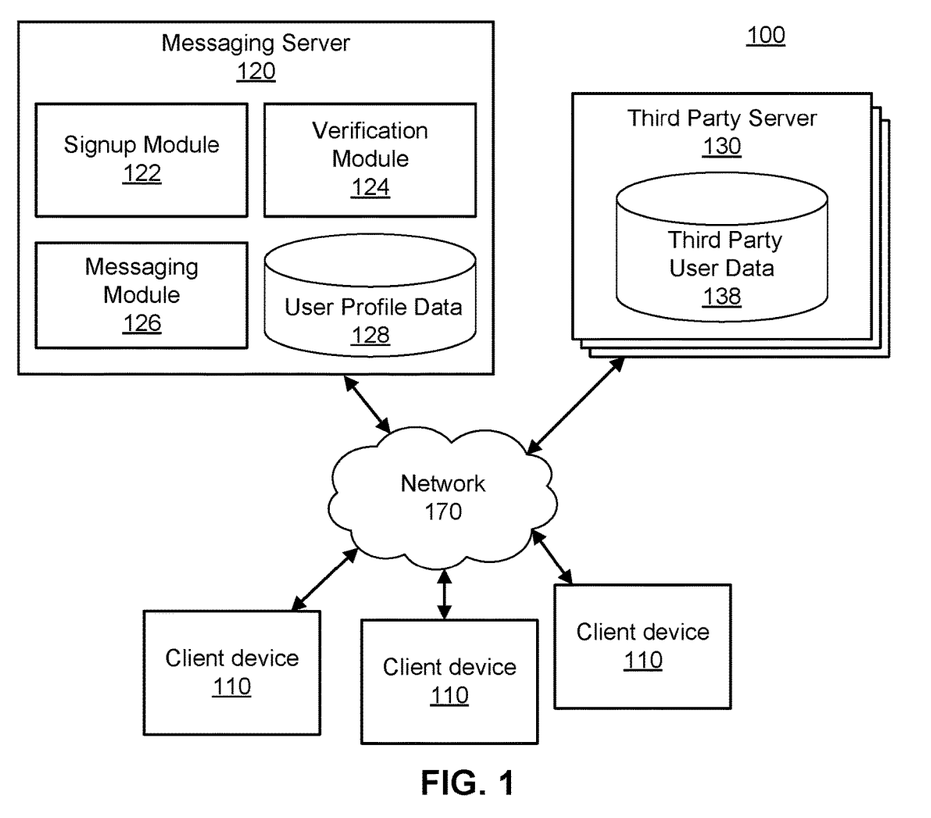
FIG. 1 is a high-level block diagram illustrating a networked computing environment through which customers and businesses can communicate, according to one embodiment.

FIG. 1 shows one embodiment of a networked computing environment 100 through which customers and businesses can communicate. In the embodiment shown in FIG. 1, the networked computing environment 100 includes three client devices 110, a messaging server 120, and one or more third party servers 130, all connected via a network 170. Although only three client devices 110 are shown, in practice, many (e.g., thousands or even millions of) client devices may be connected to the network 170 at any given time. Similarly, there may be more than one third part server 130 operated by different third parties. In other embodiments, the networked computing environment 100 contains different and/or additional elements. In addition, the functions may be distributed among the elements in a different manner than described.

The client devices 110 are computing devices capable of receiving user input as well as transmitting and/or receiving data via the network 170. The client devices 110 can take various forms such as desktop computers, laptop computers, personal digital assistants (PDAs), mobile telephones, smartphones, and other suitable devices. In one embodiment, a user can sign up for an account with a messaging service (e.g., as operated by the messaging server 120) using a client device 110. The user can request that the account be setup as a business account as part of the signup process. Once the account is created, the user can send messages to other users of the messaging service (e.g., to potential customers) using the client device 110. Embodiments of the client devices 110 are described in greater detail below, with reference to FIG. 2.

The messaging server 120 provides a messaging service that enables the client devices 110 to exchange messages. In the embodiment shown in FIG. 1, the messaging server 120 includes a signup module 122, a verification module 124, a messaging module 126, and a store for user profile data 128. In other embodiments, the messaging server 120 contains different and/or additional elements. In addition, the functions may be distributed among the elements in a different manner than described.

The signup module 122 processes requests to create new accounts for the messaging system. In one embodiment, the signup module 122 receives a request for a new account from a client device 1120. The request includes a name for the new account, a contact point (e.g., a phone number), and an indication of whether the new account should be a business account or a personal account. If the request is for a business account, the signup module 122 passes the name and contact point to the verification module 124 for verification that the provided information likely corresponds to a genuine business. A request for a personal account may also require some form of verification (e.g., two factor authentication to confirm that the user has access to the provided contact point). One of skill in the art will appreciate various processes that may be used to verify the identity of a user requesting a personal account with the messaging service.

The verification module 124 receives an account name and contact point from the signup module 122. The verification module 124 analyzes one or more signals to determine whether the request is likely to have originated from a genuine business. The analysis of example signals is described in greater detail below, with reference to FIGS. 3 and 4. In one embodiment, if the verification module 124 verifies that the request is likely to have originated from a genuine business, the new business account is created. Alternatively, the new account may be created regardless of verification, with verified accounts being identified to users in the messaging system (e.g., by displaying a green check mark next to the account name in address books and received messages). In one embodiment, verification is not performed as part of the signup process. Rather, the holder of a business account may request verification at a later time (e.g., by submitting a verification request from a messaging application on a client device 110).

The messaging module 126 manages the exchange of messages between client devices 110. The messaging module 126 receives a message from a sending client device 110. The message includes message content and a contact point (e.g., a phone number) for one or more intended recipients. In one embodiment, the messaging module 126 adds the message to a queue for each recipient. When a recipient next connects to the messaging server 120 from a client device 110 (e.g., by logging into a messaging application), the message is pulled from the messaging server. In another embodiment, the messaging module 126 identifies a client device 110 for each recipient (e.g., by looking it up in the user profile data 128) and pushes the message to that client device. In a further embodiment, once accounts have been created, the client devices 110 may exchange messages directly using a peer-to-peer protocol.

The user profile data 128 is stored on one or more computer-readable storage media. The user profile data 128 includes a profile for each user of the messaging service. In one embodiment, a user profile includes a contact point (e.g., a phone number), an account type (e.g., business or personal), and a contacts list. To protect user privacy, the contacts list only indicates the contact point of each contact, not the name or any other identifying information associated with that contact point. In other embodiments, the user profile may include different or additional information relating to the corresponding user.

A third party server 130 provides another service to the client devices 110. Examples of such services include social networking, on-line retail, other messaging services, providing confirmation that a contact point corresponds to a genuine business, and the like. Although the term third party is used to distinguish from the messaging server 120, a third party server 130 may be operated by the same entity that provides the messaging service. In the embodiment shown in FIG. 1, the third party server includes third party user data 138 (e.g., stored on one or more computer-readable media). The third party user data is available to the messaging server 120 via the network 170. Thus, the third party user data 138 can be used to aid in the verification process. Use of third party user data 138 to aid the verification process is described in greater detail below, with reference to FIGS. 3 and 4.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
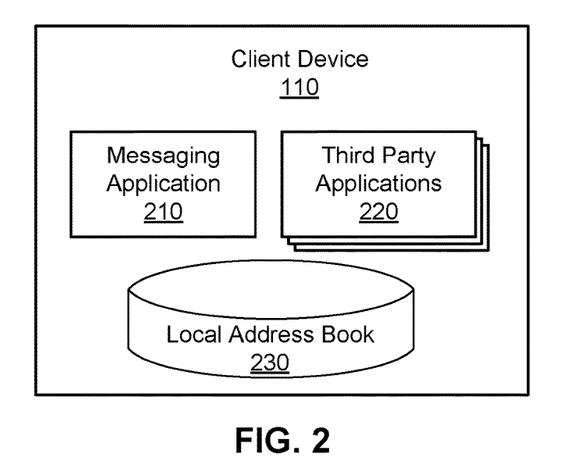
FIG. 2 is a high-level block diagram illustrating a client device suitable for use in the networked computing environment of FIG. 1, according to one embodiment.

FIG. 2 shows one embodiment of a client device 110 suitable for use in the networked computing environment 100. In the embodiment shown in FIG. 2, the client device 110 includes a messaging application 210, one or more third party applications 220, and a local address book 230. In other embodiments, the client device 110 contains different and/or additional elements. In addition, the functions may be distributed among the elements in a different manner than described.

The messaging application 210 is software executing on the client device 110 that interacts with the messaging server 110. In one embodiment, the messaging application 210 provides a user interface that guides the user through the signup process. For example, the user interface might first prompt the user to select whether the account is for personal or business use. If the user indicates the account is for business use, the user interface might then prompt the user for a phone number and business name, which the messaging application 210 sends to the messaging server 120.

The messaging application 210 also provides a user interface with which the user can send and/or receive messages. In one embodiment, the user creates message content using the client device 110 (e.g., by typing a message on a keyboard, taking a photograph with a camera, making an audio recording, or the like), and selects one or more recipients (e.g., from a local address book 230). The messaging application 210 then sends the message content and identifying information for the recipients (e.g., phone numbers) to the messaging server 120, which sends them on to client devices 110 of the recipients. As noted previously, in another embodiment, the messaging application 210 sends the messages directly to the recipient's client device 110 (e.g., using a peer-to-peer protocol). Although the messaging application 210 is shown as a single entity, in some embodiments, the signup process and messaging services are provided by separate applications.

The third party applications 220 are software with which the client device 110 interacts with third party servers 130. Through these interactions, the user may provide information to the third party servers 130 (e.g., to be included in the third party user data 138) that is helpful in distinguishing between personal and business users. For example, a third party application 220 might be a social networking application through which the user establishes a profile on the social network. The social network profile might include a phone number and indicate that the user is "Trent's Pizza Restaurant." As another example, a third party server 130 might provide a business directory service that lists businesses along with phone numbers. Thus, the third party user data 138 can provide indications of whether a phone number corresponds to a genuine business.

The local address book 230 is stored on one or more computer-readable media and includes a list of the user's contacts. In one embodiment, each contact has a phone number and a name that the user has associated with the contact. Contacts may include additional information, such as email addresses, physical addresses, fax numbers, and the like.

Figure 3:
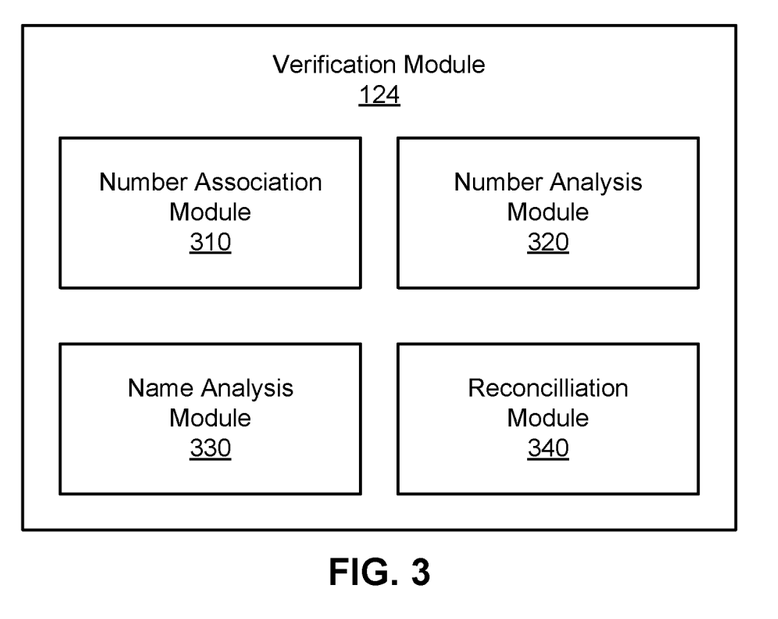
FIG. 3 is a high-level block diagram illustrating of the verification module of the messaging server shown in FIG. 1, according to one embodiment.

FIG. 3 shows one embodiment of the verification module 124 of the messaging server 120. The verification module 124 is explained in the context of the contact point being a phone number by way of example, but other types of contact point (e.g., email addresses, physical addresses, etc.) may be used. In the embodiment shown in FIG. 3, the verification module 124 includes a number association module 310, a number analysis module 320, a name analysis module 330, and a reconciliation module 340. In other embodiments, the verification 124 contains different and/or additional elements. In addition, the functions may be distributed among the elements in a different manner than described.

The number association module 310 determines whether a phone number provided for a business account is associated with the name provided for that account. A genuine association can be inferred if many users associated the same or a similar name with the phone number in their address books. However, as described previously, the messaging server 120 may only have access to the numbers a user has stored, but not the associated names, to protect user privacy.

In one embodiment, the number association module 310 identifies a set of users who have the provided number stored in their address books, referred to as the query set. The number association module 310 sends client devices 110 corresponding to users in the query set a representation of the provided name (referred to as the query name) along with the provided number (referred to as the query number). The client devices 110 send back one or more matching scores indicating how closely the locally-stored name for the query number matches the query name. Based on the received matching scores, the number association module 310 determines whether the provided number is genuinely associated with the provided name. This approach is described in greater detail below, with reference to FIG. 4.

The number analysis module 320 determines whether a phone number corresponds to a genuine business. In one embodiment, the number analysis module 320 sends the phone number to a third-party verification service (e.g., provided by a third party server 130) and receives a response indicating either the phone number is verified as corresponding to a genuine business or it is not. In another embodiment, the third party service returns a measure of likelihood (e.g., a percentage) that the phone number corresponds to a genuine business. In other embodiments, other approaches to determining whether the phone number corresponds to a genuine business may be used.

The name analysis module 330 analyzes the name provided for a business account to determine whether it is likely to be the name of a genuine business. In various embodiments, the name analysis module 330 applies a machine-learned classifier to the provided name. The classifier is initially trained in a supervised phase using a training set of known business and non-business names (e.g., business and non-business names extracted from the third party user data 138). The classifier may output an absolute prediction (business name or not a business name) or a prediction that includes a probability that it is accurate. Once trained, the classifier can be applied to previously unseen names to predict whether the provided name is one that is likely to belong to a business. For example, John Smith is not likely to be the name of a business, but John's Pizza is. In one embodiment, the name analysis module 330 applies a linear text classifier to categorize the name as either a business name or a non-business name. Alternatively, other forms of classifier may be used.

The reconciliation module 340 receives the outputs of the other modules in the verification module 124 and analyzes the outputs to determine whether a purported business account is likely to correspond to a genuine business. In various embodiments, the output of each of the other modules in the verification module 124 is a signal and the reconciliation module 340 combines the signals to predict whether the purported business account corresponds to a genuine business. The signals may be weighted and/or processed using a decision tree or other branching structure to make the prediction.

For example, in one embodiment, the reconciliation module 340 determines that the business account corresponds to a genuine business if the number association module 310 indicates the query number and query name match and the number analysis module 320 and the name analysis module 330 indicate that the phone number and name are both likely to correspond to a business. In another embodiment, if the number association module 310 indicates the query number and query name match and either the number analysis module 320 or the name analysis module 330 concludes that the number or name is likely (e.g., with a likelihood exceeding a threshold), to correspond to a genuine business, respectively, the reconciliations module 340 concludes that the account likely corresponds to a business.

In a further embodiment, the reconciliation module 340 computes an overall probability that the account corresponds to a genuine business. If the overall probability exceeds a probability threshold, the reconciliation module 340 determines that the account corresponds to a genuine business. The overall probability may be computed by taking a weighted average of the confidence probabilities reported by the number association module 310, number analytics module 320, and name analysis module 330, where the average is weighted by a pre-designated importance of each module. Alternatively, the overall probability may be computed by taking the minimum of the confidence probability reported by each individual module. Other ways of determining the overall probability may also be used.

Figure 4:
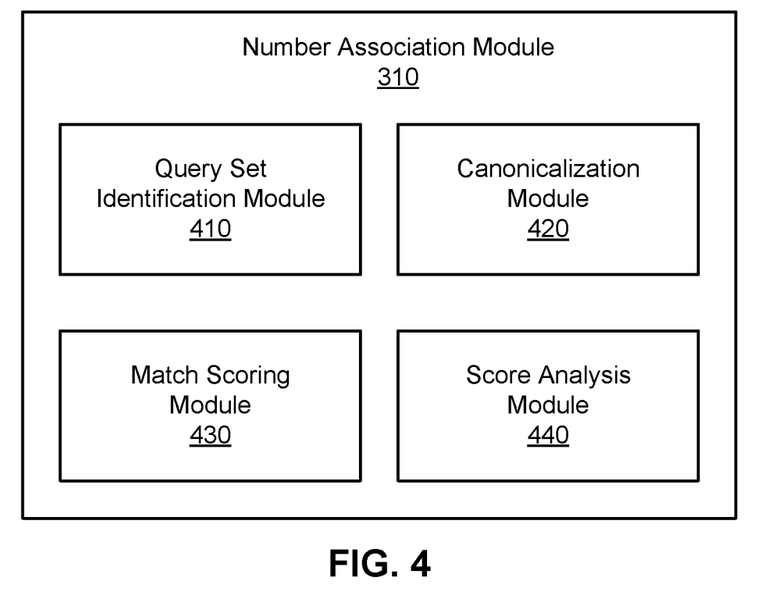
FIG. 4 is a high-level block diagram illustrating the number association module shown in FIG. 3, according to one embodiment.

FIG. 4 shows one embodiment of the number association module 310 that determines whether a phone number provided for a purported business account is associated with the name provided for that account. Similar modules may be used to determine whether other contact points are associated with a provided name. For example, an email address association module (not shown) might be used to determine whether an email address is associated with a provided name. In the embodiment shown in FIG. 4, the number association module 310 includes a query set identification module 410, a canonicalization module 420, a match scoring module 430, and a score analysis module 440. In other embodiments, the number association module 310 contains different and/or additional elements. In addition, the functions may be distributed among the elements in a different manner than described.

The query set identification module 410 identifies a set of user accounts (the query set) that have the phone number provided for the purported business account stored in their address books. In various embodiments, the user profile data 128 includes a list of phone numbers that each user has stored in an address book but not the corresponding name (as described previously). The query set identification module 410 identifies users that have the provided phone number in their address book. In one embodiment, the query set includes all users that have the provided phone number in their address book. In another embodiment, the query set is capped at a maximum size (e.g., 1,000 users). In this case, the users included in the query set can be selected from among those that have the provided phone number in their address book randomly or based on features of their profile (e.g., selecting users with the oldest profiles, selecting users alphabetically, and the like).

The canonicalization module 420 takes the provided name and converts it into a standardized form, referred to as the query name. In various embodiments, the canonicalization module 420 takes a string containing the provided name and splits it into a set of tokens by cutting the string at delimiting characters. Typically, whitespace characters are used as delimiters, but additional and/or different delimitating characters may also be used (e.g., dashes, parentheses, colons, semi-colons, etc.). The canonicalization module 420 may also standardize the potential tokens by converting them to a single case (i.e., upper case or lower case), removing punctuation, and the like. Alternatively, the provided name may not be tokenized. In such cases, tokenization may be performed by client devices 110 corresponding to users in the query set, or analysis may be performed using techniques that do not involve the query name being tokenized.

In one embodiment, the canonicalization module 420 performs further standardization on the potential tokens to generate the query name. The further standardization may include comparing adjacent potential tokens and merging them if the combination refers to a single semantic concept or grammatical function. For example, San Francisco might be represented as a single token as it defines a single semantic concept, the city of San Francisco. The further processing may also include removing potential tokens that the canonicalization module 420 determines are unlikely to be relevant. For example, articles (a, an, or the) are often omitted by users in their address book so are unlikely to provide value in determining whether the name a user has stored for the provided phone number matches the provided name. Similarly, official business entity suffixes such as LLC and Inc. are unlikely to be included in users' address books. Alternatively, the provided name may be filtered to remove such words that are unlikely to provide value before tokenization.

The match scoring module 430 sends a query to client devices 110 corresponding to the query set of users. The query includes the query name and the provided phone number (the query number). The match scoring module 430 may push the query to the client devices 110 of the query set (e.g., as indicated in the user profile data 128) or add the query to a message queue for each user in the set. In the latter case, the next time the user connects to the messaging server 120 with a client device 110 (e.g., by logging into the messaging application 210), the client device pulls the query from the server. Thus, the match scoring module 430 need not (but may) know the identity of the user's client device 110 in advance. In response, the match scoring module 430 receives one or more matching scores indicating the degree to which the query name matches the name stored in the user's local address book 230 for the query number.

On receiving a query, a client device 110 looks up the local name stored in the local address book 230 for the query number and converts it into the standard form as described above for the query name. In one embodiment, the messaging application 210 on the client device 110 generates a matching score for each token in the query name. For each token in the query name, the messaging application 210 calculates a distance (e.g., the Levenshtein distance) between that token and every token of the local name, with the lowest distance being used to determine the score for that token. The score for a token can be the lowest distance or can be determined from it (e.g., with an inverse relationship, such that a higher score indicates a better match). Thus, the matching score indicates how closely the token in the query name matches a token generated from the local name.

For example, if the provided name was "Steve's Pizza" the query name would include the tokens "steves" (assuming removal of punctuation as part of the canonicalization) and "pizza." If the local name is "bad pizza" (canonicalized to "bad" and "pizza"), the messaging module 210 would generate two matching scores: one for "steves" and one for "pizza." The score for "steves" would indicate a poor match because the distance to both words in the local name is large (whichever distance is lower would be selected). However, the distance for "pizza" would be zero, because the local name also includes the word "pizza," so the score for "pizza" would indicate a good match. Thus, the client device 110 would send two matching scores back to the number association module 310, one indicating a poor match and one indicating a perfect match.

The score analysis module 440 analyzes the matching scores received from the client devices 110 that correspond to users in the query set to determine whether the provided phone number is associated with the provided name. In various embodiments, the analysis includes combining the received matching scores to generate a prediction of whether the provided phone number is associated with the provided names. The prediction may be a simple yes or no, or include a measure of likelihood (e.g., a percentage confidence that the prediction is correct). In general, a large number of matching scores indicating a large difference between tokens in the query name and the locally stored name at a client device 110 suggests that users do not associate the provided number with the provided name. Conversely, a relatively high number of exact and/or close matches between tokens in the query name and the locally stored name are indicative of a genuine association between the provided phone number and the provided name.

In one embodiment, the score analysis module 440 calculates an average total score by summing the distances for all tokens in the query name from each response and dividing by the number of responses received. If the average total score is below an average score threshold, the score analysis module 440 determines that the provided phone number is genuinely associated with the provided name. Otherwise, the score analysis module 440 determines that the provided phone number is not genuinely associated with the provided name (or at least that association cannot be verified). The score analysis module 440 may require that a minimum number of responses are received before making a determination to avoid an outlier with an unusually low score that is one of the first responses received resulting in a false positive.

In addition, the score analysis module 440 may weight the matching scores returned for each token in the query name based on the length of the token. An initial weighting score for each token can be calculated as one over the length of the token. The initial weightings can then be normalized by summing the initial weightings and then multiplying each of the initial weightings by a predetermined value (e.g., one)

over the calculated sum to generate modified weightings. Thus, the sum of the modified weightings will equal the predetermined value. A similar approach can be adopted to weight the matching scores based on other factors, such as the syntactic role of the token (e.g., by weighting nouns more heavily than adjectives), the position of the token in the query name (e.g., by weighting the first token more heavily than the second), or the like: initial weights are determined for the matching scores based on one or more factors, the initial weights are normalized to create normalized weights, the matching scores are multiplied by the corresponding normalized weights to generate weighted matching scores, and the total matching score is calculated by summing the weighted matching scores.

In another embodiment, the score analysis module 440 counts the number of responses indicating an exact match between the query name and the locally stored name (i.e., each token in the query name has a distance of zero from a token generated from the locally stored name). If the number of exact matches exceeds an exact match threshold, the score analysis module 440 determines that the provided phone number is genuinely associated with the provided name. The exact match threshold may be defined in terms of an absolute number (e.g., ten exact matches) or relative to the size of the query set (e.g., 5% of the query set).

If the number of exact matches does not exceed the exact match threshold, the score analysis module may also analyze imperfect matches. For example, if the query name includes a token that is unusual or difficult to spell, many users may have it spelled incorrectly in their local address book 230. As such, a token comparison that yields a Levenshtein distance of 1 (or more) may indicate a user's imperfect attempt to spell the business's name.

If the sum of the perfect matches and imperfect matches with a distance of one exceeds an imperfect match threshold, the score analysis module 440 determines that the provided phone number is genuinely associated with the provided name. The score analysis module 440 may continue to add additional imperfect matches with increasing distances from the query name and compare the sum to increasingly high thresholds until either the score analysis module 440 determines a genuine association or a maximum distance is reached. For example, if all imperfect matches up to a distance of five have been included and a genuine association cannot be verified, the score analysis module 440 might determine that the association is not genuine. More generally, a token comparison can be considered an imperfect match if the total distance is less than a maximum matching distance. Alternatively, the score analysis module 440 might wait for additional responses from client devices 110 or identify a new query set to obtain more data.

In a further embodiment, the number of matching individual tokens across all responses is counted, rather than the number of response that indicate an exact match for the whole query name. For example, if the query name is "Steve's pizza," but a user only stores the number locally as "pizza," this would return a match for one token (pizza), but not an exact match. If the number of matching tokens exceeds a matching token threshold, the score analysis module 440 determines that the provided phone number is genuinely associated with the provided name. As with the previous embodiment, the matching token threshold can be an absolute number or set relative to the size of the query set. The threshold may also be set based on the total number of token matching scores that could be returned (if a client device 110 of every user in the query set provided a response).

Figure 5:
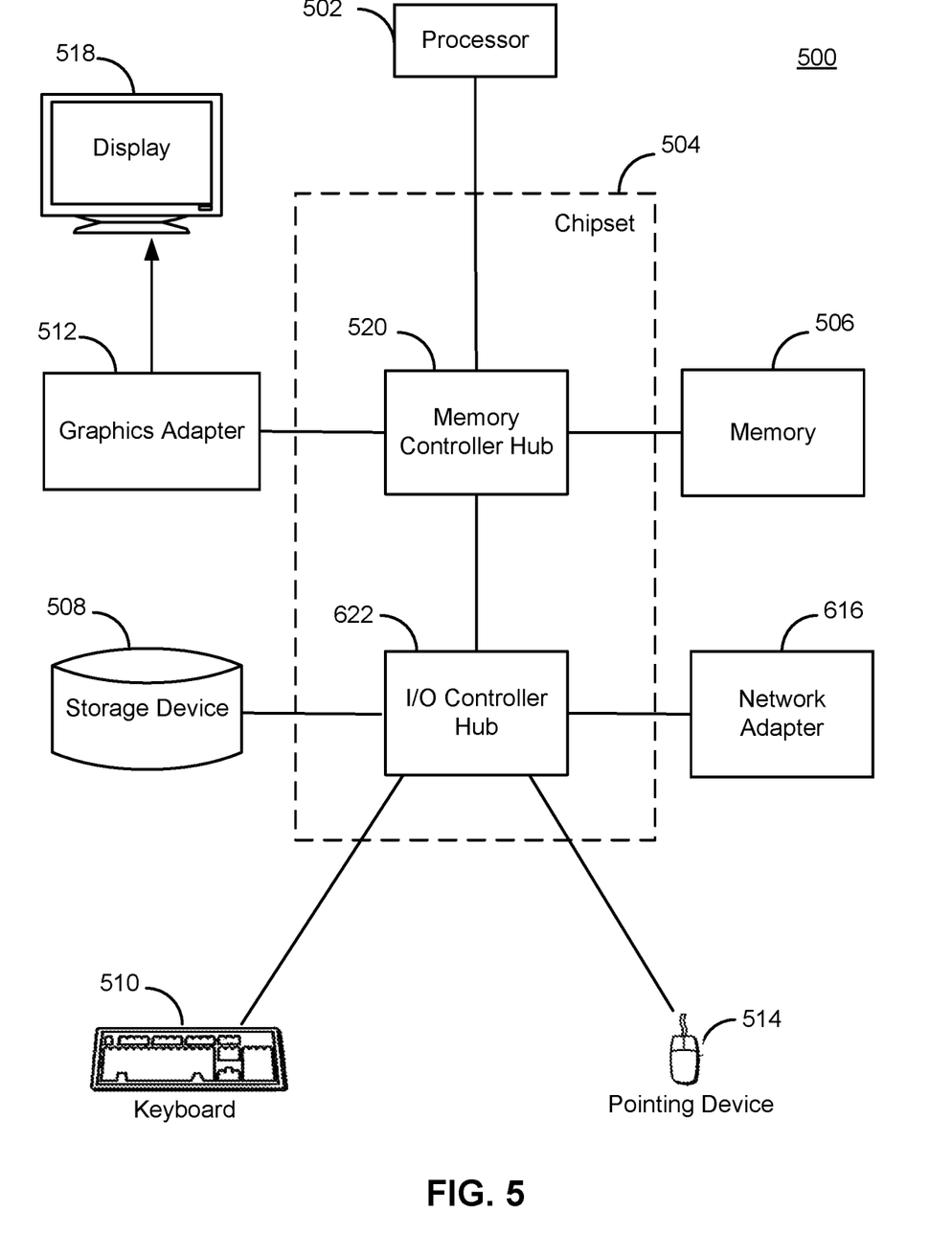
FIG. 5 is a high-level block diagram illustrating an example of a computer system suitable for use in the networked computing environment of FIG. 1, according to one embodiment.

FIG. 5 is a high-level block diagram illustrating an example computer 500 suitable for use as a client device 110, messaging server 120, or third party server 130. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and is used in combination with the keyboard 510 (which may be an on-screen keyboard) to input data into the computer system 500. The graphics adapter 512 displays images and other information on the display 518. The network adapter 516 couples the computer system 500 to one or more computer networks.

The types of computers used by the entities of FIGS. 1 through 4 can vary depending upon the embodiment and the processing power required by the entity. For example, the messaging server 120 might include a distributed database system comprising multiple blade servers working together to provide the functionality described. Furthermore, the computers can lack some of the components described above, such as keyboards 510, graphics adapters 512, and displays 518.

Example Methods

Figure 6:
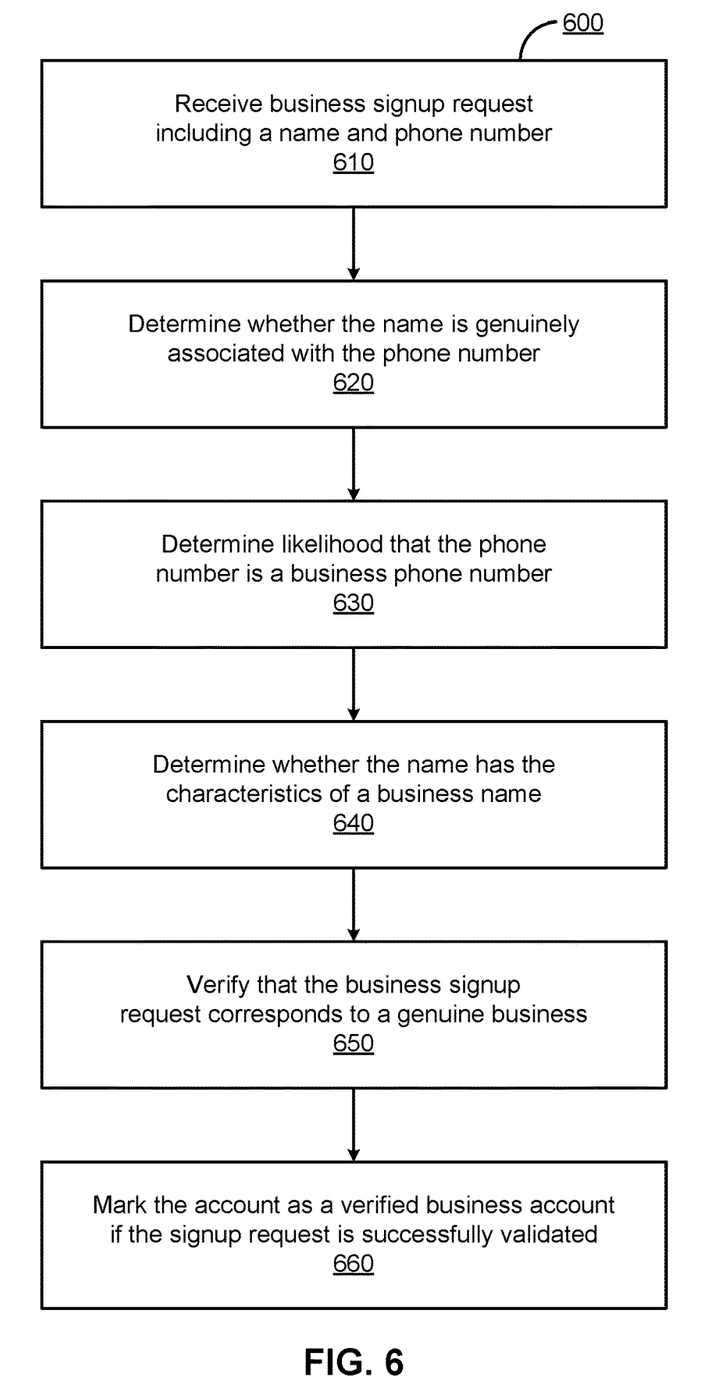
FIG. 6 is a flow-chart illustrating a method for creating a business account with an online service provider, according to one embodiment.

FIG. 6 illustrates one embodiment of a method 600 for creating a business account with an online service provider. The steps of FIG. 6 are illustrated from the perspective of the messaging server 120 performing the method 600. However, some or all of the steps may be performed by other entities or components. In addition, some embodiments may perform the steps in parallel, perform the steps in different orders, or perform different steps. For example, steps 620, 630, and 640 may be performed in any order or in parallel. Furthermore, although the method 600 is described with regards to the contact point being a phone number, as noted previously, other embodiments may use different or additional contact points.

In the embodiment shown in FIG. 6, the method 600 begins with the messaging server 120 receiving 610 a business signup request that includes a name and a phone number. In one embodiment, a user enters the name and phone number into an electronic form on a client device 110 (e.g., within an app or webpage provided by the messaging service) and the client device sends the business signup request to the messaging server 120 via the network 170.

The messaging server 120 determines 620 whether the name is genuinely associated with the phone number. In one embodiment, the number association module 310 makes this determination by querying a client devices 110 of a query set of users that have the number stored in their address book for matching scores indicating a degree to which the name matches the names the users have stored in their local address books for the phone number, as described above with reference to FIG. 4. The determination may result in a definitive conclusion (genuine association or no genuine association) or a probability that the number is genuinely associated with the name. Embodiments of a method by which the client devices 110 process the query are described in greater detail below, with reference to FIG. 7.

The messaging server 120 also determines 630 whether the phone number is likely to be a business phone number. In one embodiment, the number analysis module 320 classifies the phone number as corresponding to a business entity or a non-business entity by sending to number to a third party verification service, as described above with reference to FIG. 3. The determination may be definitive (business phone number or non-business phone number) or may result in a likelihood that the phone number is used by a business (or non-business) entity. In other embodiments, other processes for determining whether a phone number is likely to correspond to a genuine business may be used.

The messaging server 120 further determines 640 whether the name has the characteristics of a business name. In one embodiment, the name analysis module 330 classifies the name as corresponding to a business entity or a non-business entity by applying a machine-learned classifier to the name, as described above with reference to FIG. 3. The determination may be definitive (business name or non-business name) or may result in a likelihood that the names belongs to a business (or non-business) entity.

Based on at least some of the determinations in other steps, the messaging server 120 verifies 650 that the business signup request corresponds to a genuine business (or, conversely, determines that the request does not correspond to a genuine business). In one embodiment, the reconciliation module 340 verifies the signup request if the number association module 310 determines 620 that the name is genuinely associated with the phone number, the number analysis module 320 determines 630 that the phone number is a business phone number, and the name analysis module 330 determines 640 that the name has the characteristics of a business name. In another embodiment, a genuine association between the name and phone number and a determination that either the name or phone number has characteristics consistent with business use is sufficient for validation.

In some embodiments, the reconciliation module 340 may verify 650 the signup request before all of the determination steps (e.g., steps 620, 630, and 640) have been performed. For example, if the number association module 310 determines 620 that the name is genuinely associated with the phone number and the number analytics module 320 determines 630 that the phone number is a business phone number, the reconciliation module 340 may determine that the name analysis module 330 need not determine 640 whether the name has the characteristics of a business name. In other embodiments, the output from the number association module 310, the number analytics module 320, and the name analysis module 330 are combined in other ways to verify 650 (or determine not to verify) the signup request.

Assuming that the signup request was verified 650, the messaging server 120 marks 660 the account as a verified business account (e.g., by setting a verified flag for the account in the user profile data 128). In one embodiment, once a business account is marked as verified, it is displayed in the user interface of the messaging service with a visual indicator of the verification. For example, the business account might appear in users' contact lists with a green check mark next to it. Prior to verification, the business account may still be active in the messaging service but will be displayed in the user interface without the visual indicator. Alternatively or additionally, an unverified business account may be displayed in the user interface with a visual indication that it is not verified, such as a yellow exclamation point. In another embodiment, the business account is not activated in the messaging service until it is marked as verified.

Figure 7:
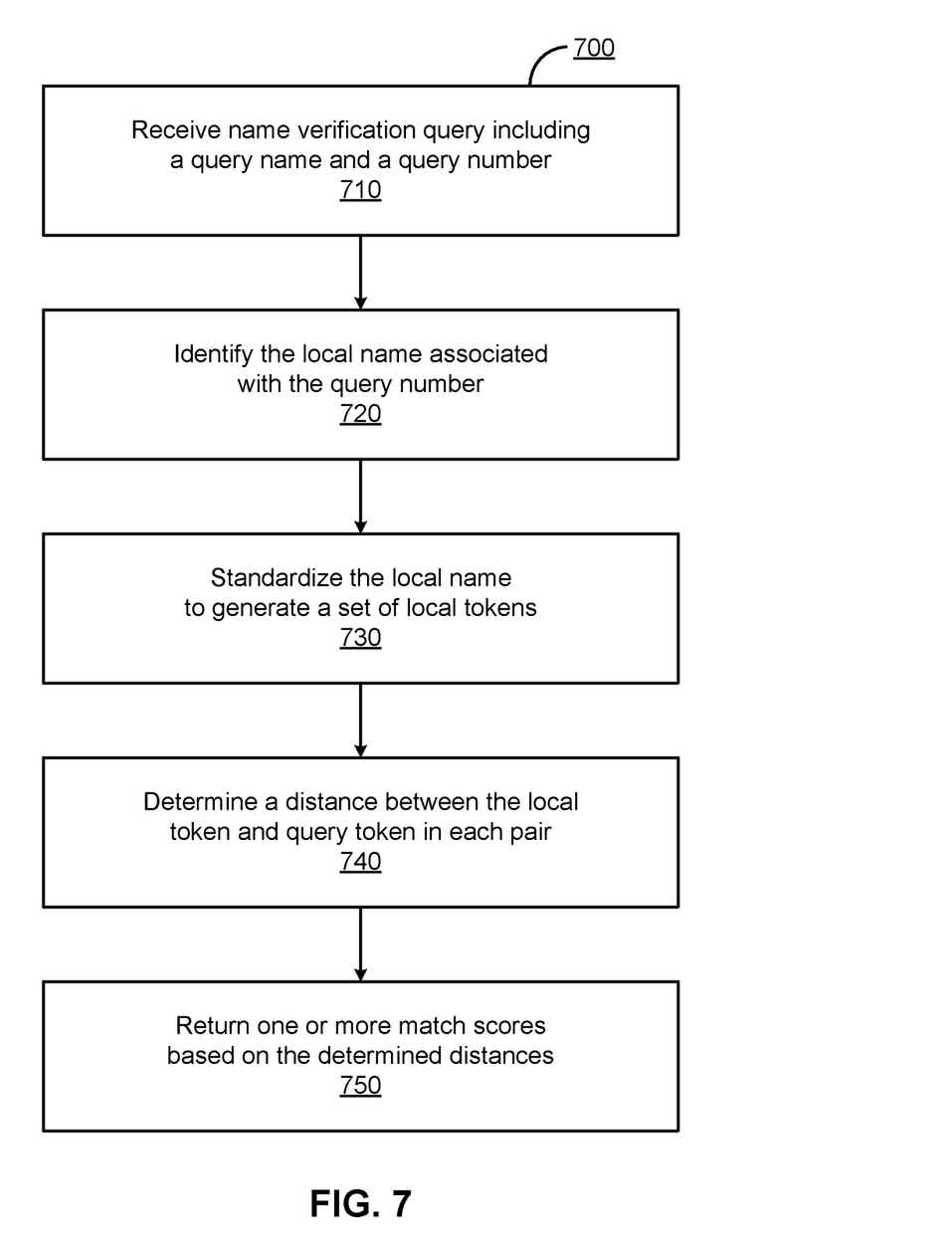
FIG. 7 is a flow-chart illustrating a method for processing a query to verify that a phone number is associated with a locally stored name, according to one embodiment.

FIG. 7 illustrates one embodiment of a method 700 for processing a name verification query. The steps of FIG. 7 are illustrated from the perspective of a client device 110 performing the method 700. However, some or all of the steps may be performed by other entities or components. In addition, some embodiments may perform the steps in parallel, perform the steps in different orders, or perform different steps.

In the embodiment shown in FIG. 7, the method 700 begins with the client device 110 receiving 710 a name verification query that includes a query name and a query number. If the query name has not already been standardized (e.g., by the canonicalization module 410) then the client device 110 standardizes the query name (not shown).

The client device 110 identifies 720 the local name associated with the query number. In one embodiment, the client device 110 searches the local address book 230 for an entry that includes the query number. Generally, the local address book 230 should include such an entry because the client device 110 is being used by a user in a query set who was identified as having the query number stored. However, if the client device determines that the query number does not appear in the local address book 230 (e.g., because the user recently deleted it and that change had not synchronized to the messaging server 120 at the time the query set was identified) then client device 110 may return an error code indicating this fact. Assuming that the local address book 230 does include an entry with the query number, the client device 110 identifies 720 the name stored in that entry as the local name.

The client device 110 standardizes 730 the local name to generate a set of local tokens. In one embodiment, the client device 110 uses a similar process as the canonicalization module 420 uses to generate a query name. Alternatively, the local address book 230 may already store a standardized form of the local name, in which case, further standardization is not required. Regardless of the specific order and network location at which the query name and local name are standardized, the result at this point is a set of local tokens and a set of query tokens representing standardized forms of the local name and query name, respectively.

The client device 110 determines 740 a distance between pairs of local tokens and query tokens. In one embodiment, for each token in the query name the client device 110 calculates the Levenshtein to each token in the local set (as described previously, with reference to FIG. 4). The client device 110 then selects the lowest Levenshtein distance for each token in the query name. Thus, the client device 110 determines 740 the lowest distance to a local token for each query token. In other embodiments, other measurements of the distance between tokens are used.

Based on the determined distances, the client device 110 returns 750 one or more match scores. In one embodiment, the client device 110 returns 750 the minimum distance for each token in the query name as a match score. In other words, the distance determined 740 by the client device 110 for each query token is the match score for that token. The client device 110 may also return the total number of local tokens as this may provide additional information about the degree to which the query name and local name match. For example, comparing the query name "Pete's Store" with the local name "Pete's Florida Shore House" might result in a pair of match scores: zero (from comparing "Pete's" with "Pete's") and one (from comparing "Store" with "Shore"), suggesting a close match. However, the difference between two tokens in the query name and four tokens in the local name indicates that the match is not as close as the distance scores alone would suggest.

In other embodiments, the distances are weighted by one or more factors to generate the match score for a query token. The factors can include the position of the token in the name (e.g., the first token may be given extra weight), the length of the token (e.g., the Levenshtein distance for a longer token is likely to be higher than for a shorter token), the type of word of the token (e.g., words that are more likely to be associated with a business, such as pizza, store, hair, etc., are given more weight than common names, such as Jones, that may appear in either business or non-business names), and the like. The client device 110 then returns the weighted distances as the scores. Alternatively, rather than returning the weighted distances as scores, the client device 100 may return unweighted scores for each query token, as well as factors associated with each query token, of which examples are provided above. This can be viewed as client device 100 returning a vector of scores rather than a single score for each query token. These factors can be used by the match scoring module 430 or score analysis module 440 to weight each query token.

In a further embodiment, the client device 110 aggregates the distances to calculate a single match score. For example, the client device 110 may calculate the match score as the average distance for all of the tokens (either weighted or unweighted). Alternatively, the client device 110 might calculate the match score as the total of all of the distances. One of skill in the art will recognize other methods of combining the distances to calculate a single match score that may be used.

Alternatively, the query name and local name may be compared without using tokenization. In some embodiments, the local name and query name are compared in a conceptual space. The local and query names may each be represented by a vector indicating values for the corresponding name in a set of feature dimensions. The degree of similarity between the local and query names can then be determined by comparing the vectors (e.g., by calculating a distance between them). In one such embodiment, a deep learning model is trained to map an input text string to a vector. The trained model is applied to the query name and local name to generate a query vector and a local vector, respectively. The difference between the two vectors can then be used to determine a matching score indicating whether (and/or how closely) the query name matches the local name. Other techniques may also be used to compare the query name to the local name.

Example Signup and Validation Process

Figure 8:
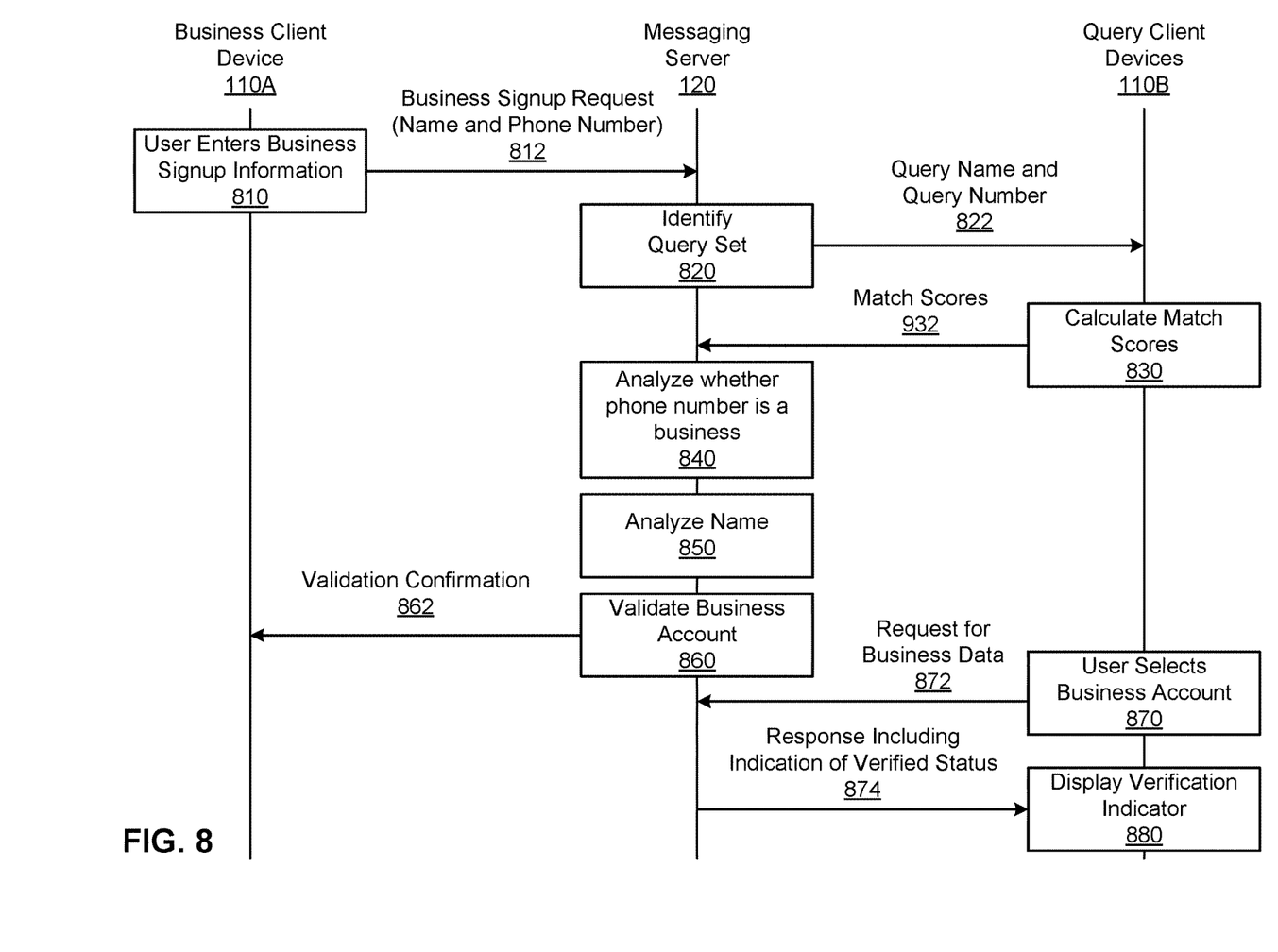
FIG. 8 is an interactions diagram illustrating a business account signup and validation process, according to one embodiment.

FIG. 8 illustrates the interactions between various entities in a networked computing environment 100 during a business account signup and validation process, according to one embodiment. In the embodiment shown in FIG. 8, the process involves a business client device 110A (e.g., a smartphone from which the business intends to operate an account with a messaging service), a messaging server 120, and query client devices 110B (e.g., smartphone of existing users of the messaging service). In other embodiments, different entities may perform some or all of the operations and some of the operations may be performed in parallel or in different orders. In addition, some embodiments include different and/or additional operations.

In the embodiment shown in FIG. 8, the process begins with a user entering 810 business signup information. For example, the user might use an interface within an app on the business client device 110A or within a webpage to request a new business account. The interface solicits a business name and phone number from the user. The business client device 110A sends 812 a business signup request including the business name and phone number to the messaging server 120.

The messaging server 120 attempts to verify the request as having come from a genuine business having the specified name. In one embodiment, the messaging server 120 identifies 820 a query set of users that have the query name stored in their local address book 230 and sends a query 822 (including a query name and a query number) to query client devices 110B that correspond to the users (e.g., as described above with reference to FIG. 4). The query client devices 110B calculate 830 match scores 832 indicating how closely the query name matches a locally stored name for the query number and sends the match scores to the messaging server 120.

The messaging server 120 also analyzes 840 whether the phone number is likely to correspond to a genuine business and analyzes 850 the name provided for the business to determine whether it has the characteristics of a business name. As described above, with reference to FIG. 3, in one embodiment, the messaging server 120 uses a third party verification service to determine whether the phone number is likely to correspond to a genuine business and applies a machine-learned classifier to the name to predict whether it corresponds to a business or non-business entity.

Based on the match scores 832, analysis 840 of the phone number, and analysis 850 of the name, the messaging server determines whether to verify 860 the business account. Assuming that the messaging server 120 verifies 860 the business account, it may send a validation confirmation 862 to the business client device 110A to inform the user that submitted the request that the account has now been verified.

At a later time, a user of a query client device 110B (or a user of another client device 110 using the messaging service) selects 870 the now verified business account. In one embodiment, this may be an explicit selection of the account (e.g., by requesting to view a profile of the business account within the messaging service), or may be the result of the user adding the business account to the user's address book, receiving a message from the business account, or the like.

The user's client device 110B sends a request for business data 872 to the messaging server 120. The messaging server 120 provides a response 874 including an indication that the business account is verified. The content of the request 872 and response 874 may depend on the nature of the request and how it was generated. For example, if the user selected the business account profile, the request 872 may indicate that the message server should provide all profile data for the business account and the response 874 may include the full business account profile, including an indication that the account is verified (e.g., a verification flag). In contrast, if the selection was the result of receiving a message from the business, the request 872 may simply be a request for all new messages for the user to be pulled from the messaging server 120 to the user's client device 110B. In which case, the response 874 might include the business name, a flag indicating the account is verified, and the content of the message.

On receiving the response 874, the user's client device 110B displays the requested business data (e.g., the business profile, a message from the business, etc.) in conjunction with a visual indication that the account is verified (e.g., a green check mark). Thus, the user can proceed to interact with the business account with greater confidence that they are dealing with a genuine business.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A method comprising:
    receiving, at a server, a request for a business account with a messaging system, the request including a business name and a phone number;
    determining whether users of the messaging system associate the business name with the phone number, the determining comprising:
        sending name verification queries to set of client devices that have the phone number stored in a local address book, the name verification queries including a representation of the business name and the phone number;
        receiving, from at least some of the set of client devices, sets of one or more matching scores, each set of one or more matching scores indicating a degree to which a local name, stored in the local address book of the corresponding client device in association with the phone number, matches the representation of the business name;
        determining a number of client devices in the set of client devices for which the corresponding set of one or more matching scores indicates an exact match between the representation of the business name and the local name stored in the local address book;
        determining that the number of client devices for which the corresponding set of one or more matching scores indicates an exact match exceeds an exact match threshold; and
        determining that the users of the messaging system associate the business name with the phone number responsive to the exact match threshold being exceeded;
    determining whether at least one of the business name or the phone number has characteristics consistent with the request originating from a genuine business;
    validating the business account responsive to the users of the messaging system associating the business name with the phone number and at least one of the business name or the phone number having characteristics consistent with the request originating from the genuine business;
    updating, responsive to the validating, profile data of the business account to indicate that the business account is verified;
    receiving, from a client device that is associated with the business account, a message including content to display to a user of the messaging system; and
    sending the content to a client device associated with the user of the messaging system in conjunction with an indication that the business account is verified, wherein the client device is adapted to display the content in conjunction with a visual indicator that the business account is verified responsive to the indication.

2. The method of claim 1, wherein determining whether the users of the messaging system associate the business name with the phone number further comprises:
    identifying a query user having the phone number stored in an address book of the query user's client device, the identifying based on a partial copy of the address book stored at the server that does not include a name the query user associates with the phone number; and
    including the query user's client device in the set of client devices.

3. The method of claim 2, wherein sending the name verification query to the query user's client device comprises:
    adding the name verification query to a message queue for the query user at the server;
    receiving a connection request from the query user's client device; and
    sending messages in the message queue, including the name verification query, to the query user's client device responsive to the connection request.

4. The method of claim 1, wherein determining whether the phone number has characteristics consistent with the request originating from the genuine business comprises:
    sending a verification request to a verification service, the verification request including the phone number; and
    receiving, from the verification service, a response to the verification request indicating whether the phone number is likely to correspond to the genuine business.

5. The method of claim 1, wherein determining whether the business name has characteristics consistent with the request originating from the genuine business comprises applying a machine-learned classifier to the business name, the machine-learned classifier having been trained to distinguish between business names and non-business names.

6. The method of claim 1, wherein validating the business account comprises:
    calculating a probability that the business account corresponds to the genuine business based on a probability that the users of the messaging system associate the business name with the phone number, a probability that the business name corresponds to the genuine business, and a probability that the phone number belongs to the genuine business; and
    determining that the business account corresponds to the genuine business if the probability that the business account corresponds to the genuine business exceeds a probability threshold.

7. The method of claim 1, further comprising creating the business account prior to validating the business account,
    wherein the profile data of the business account includes a flag that indicates whether the business account is verified, the flag having a first state that indicates the business account is not verified and a second state that indicates that the business account is verified,
    wherein the updating comprising changing the flag from the first state to the second state, and
    wherein the indication sent to the client device is a copy of the flag, the client device being further adapted to display the content in conjunction with a visual indicator that the business account is not-verified responsive to the copy of the flag being in the first state.

8. A non-transitory computer-readable medium storing computer program instructions executable by a processor to perform operations comprising:
    receiving, at a server, a request for a business account with a messaging system, the request including a business name and a phone number;
    determining whether users of the messaging system associate the business name with the phone number, the determining comprising:
        sending name verification queries to set of client devices that have the phone number stored in a local address book, the name verification queries including a representation of the business name and the phone number;
        receiving, from at least some of the set of client devices, sets of one or more matching scores, each set of one or more matching scores indicating a degree to which a local name, stored in the local address book of the corresponding client device in association with the phone number, matches the representation of the business name;
        determining a number of client devices in the set of client devices for which the corresponding set of one or more matching scores indicates an exact match between the representation of the business name and the local name stored in the local address book;
        determining that the number of client devices for which the corresponding set of one or more matching scores indicates an exact match exceeds an exact match threshold; and
        determining that the users of the messaging system associate the business name with the phone number responsive to the exact match threshold being exceeded;
    determining whether at least one of the business name or the phone number has characteristics consistent with the request originating from a genuine business;
    validating the business account responsive to the users of the messaging system associating the business name with the phone number and at least one of the business name or the phone number having characteristics consistent with the request originating from the genuine business;
    updating, responsive to the validating, profile data of the business account to indicate that the business account is verified;
    receiving, from a client device that is associated with the business account, a message including content to display to a user of the messaging system; and
    sending the content to a client device associated with the user of the messaging system in conjunction with an indication that the business account is verified, wherein the client device is adapted to display the content in conjunction with a visual indicator that the business account is verified responsive to the indication.

9. The non-transitory computer-readable medium of claim 8, wherein determining whether the users of the messaging system associate the business name with the phone number further comprises:
    identifying a query user having the phone number stored in an address book of the query user's client device, the identifying based on a partial copy of the address book stored at the server that does not include a name the query user associates with the phone number; and
    including the query user's client device in the set of client devices.

10. The non-transitory computer-readable medium of claim 9, wherein sending the name verification query to the query user's client device comprises:
    adding the name verification query to a message queue for the query user at the server;
    receiving a connection request from the query user's client device; and
    sending messages in the message queue, including the name verification query, to the query user's client device responsive to the connection request.

11. The non-transitory computer-readable medium of claim 8, wherein determining whether the phone number has characteristics consistent with the request originating from the genuine business comprises:
    sending a verification request to a verification service, the verification request including the phone number; and receiving, from the verification service, a response to the verification request indicating whether the phone number is likely to correspond to the genuine business.

12. The non-transitory computer-readable medium of claim 8, wherein determining whether the business name has characteristics consistent with the request originating from the genuine business comprises applying a machine-learned classifier to the business name, the machine-learned classifier having been trained to distinguish between business names and non-business names.

13. The non-transitory computer-readable medium of claim 8, wherein validating the business account comprises:
calculating a probability that the business account corresponds to the genuine business based on a probability that the users of the messaging system associate the business name with the phone number, a probability that the business name corresponds to the genuine business, and a probability that the phone number belongs to the genuine business; and
determining that the business account corresponds to the genuine business if the probability that the business account corresponds to the genuine business exceeds a probability threshold.

14. The non-transitory computer-readable medium of claim 8, wherein the operations further comprise creating the business account prior to validating the business account,
wherein the profile data of the business account includes a flag that indicates whether the business account is verified, the flag having a first state that indicates the business account is not verified and a second state that indicates that the business account is verified,
wherein the updating comprising changing the flag from the first state to the second state, and
wherein the indication sent to the client device is a copy of the flag, the client device being further adapted to display the content in conjunction with a visual indicator that the business account is not-verified responsive to the copy of the flag being in the first state.

15. A computer system comprising:
one or more processors; and
one or more computer readable media storing computer program instructions that, when executed, cause the one or more processors to perform operations including:
receiving, by the computer system, a request for a business account with a messaging system, the request including a business name and a phone number;
determining whether users of the messaging system associate the business name with the phone number, the determining comprising:
sending name verification queries to set of client devices that have the phone number stored in a local address book, the name verification queries including a representation of the business name and the phone number;
receiving, from at least some of the set of client devices, sets of one or more matching scores, each set of one or more matching scores indicating a degree to which a local name, stored in the local address book of the corresponding client device in association with the phone number, matches the representation of the business name;
determining a number of client devices in the set of client devices for which the corresponding set of one or more matching scores indicates an exact match between the representation of the business name and the local name stored in the local address book;
determining that the number of client devices for which the corresponding set of one or more matching scores indicates an exact match exceeds an exact match threshold; and
determining that the users of the messaging system associate the business name with the phone number responsive to the exact match threshold being exceeded;
determining whether at least one of the business name or the phone number has characteristics consistent with the request originating from a genuine business;
validating the business account responsive to the users of the messaging system associating the business name with the phone number and at least one of the business name or the phone number having characteristics consistent with the request originating from the genuine business;
updating, responsive to the validating, profile data of the business account to indicate that the business account is verified;
receiving, from a client device that is associated with the business account, a message including content to display to a user of the messaging system; and
sending the content to a client device associated with the user of the messaging system in conjunction with an indication that the business account is verified, wherein the client device is adapted to display the content in conjunction with a visual indicator that the business account is verified responsive to the indication.

16. The computer system of claim 15, wherein determining whether the users of the messaging system associate the business name with the phone number further comprises:
identifying a query user having the phone number stored in an address book of the query user's client device, the identifying based on a partial copy of the address book stored at the computer system that does not include a name the query user associates with the phone number; and
including the query user's client device in the set of client devices.

17. The computer system of claim 16, wherein sending the name verification query to the query user's client device comprises:
adding the name verification query to a message queue for the query user at the computer system;
receiving a connection request from the query user's client device; and
sending messages in the message queue, including the name verification query, to the query user's client device responsive to the connection request.

18. The computer system of claim 15, wherein determining whether the phone number has characteristics consistent with the request originating from the genuine business comprises:
sending a verification request to a verification service, the verification request including the phone number; and
receiving, from the verification service, a response to the verification request indicating whether the phone number is likely to correspond to the genuine business.

19. The computer system of claim 15, wherein determining whether the business name has characteristics consistent with the request originating from the genuine business comprises applying a machine-learned classifier to the business name, the machine-learned classifier having been trained to distinguish between business names and non-business names.

20. The computer system of claim 15, wherein the operations further comprise creating the business account prior to validating the business account,
   wherein the profile data of the business account includes a flag that indicates whether the business account is verified, the flag having a first state that indicates the business account is not verified and a second state that indicates that the business account is verified,
   wherein the updating comprising changing the flag from the first state to the second state, and
   wherein the indication sent to the client device is a copy of the flag, the client device being further adapted to display the content in conjunction with a visual indicator that the business account is not-verified responsive to the copy of the flag being in the first state.

* * * * *